(12) United States Patent
Abramson et al.

(10) Patent No.: US 9,268,331 B2
(45) Date of Patent: Feb. 23, 2016

(54) DOMESTIC ROBOTIC SYSTEM AND ROBOT THEREFOR

(71) Applicant: F. Robotics Acquisitions Ltd, Pardesia (IL)

(72) Inventors: Shai Abramson, Har-Halutz (IL); Ran Zaslavsky, Kfar Saba (IL); Ido Ikar, Tel-Mond (IL)

(73) Assignee: F ROBOTICS ACQUISITIONS LTD., Pardesia (IL)

( * ) Notice: Subject to any disclaimer, the term of this patent is extended or adjusted under 35 U.S.C. 154(b) by 61 days.

(21) Appl. No.: 14/249,102

(22) Filed: Apr. 9, 2014

(65) Prior Publication Data

US 2014/0324269 A1  Oct. 30, 2014

(30) Foreign Application Priority Data

Apr. 9, 2013  (GB) .................................. 1306437.3

(51) Int. Cl.
*G05D 1/02* (2006.01)
*A01D 34/00* (2006.01)

(52) U.S. Cl.
CPC ............ *G05D 1/0212* (2013.01); *A01D 34/008* (2013.01); *G05D 1/0214* (2013.01); *G05D 1/0265* (2013.01); *G05D 2201/0208* (2013.01); *Y10S 901/01* (2013.01)

(58) Field of Classification Search
CPC . G05D 1/0212; G05D 1/0214; G05D 1/0255; G05D 1/0238; G05D 1/0265; G05D 1/0219; G05D 2201/0208; Y10S 901/01; A01D 34/008
See application file for complete search history.

(56) References Cited

U.S. PATENT DOCUMENTS

| | | | | |
|---|---|---|---|---|
| 4,878,003 | A * | 10/1989 | Knepper | 318/587 |
| 6,615,108 | B1 * | 9/2003 | Peless et al. | 700/245 |
| 6,830,120 | B1 | 12/2004 | Yashima et al. | |
| 7,706,948 | B2 * | 4/2010 | Dix et al. | 701/50 |
| 2008/0097645 | A1 * | 4/2008 | Abramson et al. | 700/258 |

FOREIGN PATENT DOCUMENTS

| | | | |
|---|---|---|---|
| GB | 980604 | | 1/1965 |
| JP | 11-212642 | * | 8/1999 |

OTHER PUBLICATIONS

United Kingdom Intellectual Property Office search report of Oct. 8, 2013 for GB 1306437.3, filed Apr. 9, 2013.

* cited by examiner

*Primary Examiner* — Michael J Zanelli
(74) *Attorney, Agent, or Firm* — Gerry J. Elman; Elman Technology Law, P.C.

(57) ABSTRACT

A domestic robotic system that includes a robot, which is programmed to move within a working area defined by a boundary and has boundary distance sensors that enable it to estimate the current distance from the boundary; the robot is programmed to move across the working area and, secondly, so that when the boundary distance sensors indicate that the robot is a distance X away from the boundary and is approaching the boundary, the robot begins performing a gradual turn; this gradual turn is such that: the robot progressively changes direction while continuing to move across said working area; and the robot transitions from approaching the boundary to receding from the boundary; the robot is also programmed to calculate a path for the gradual turn such that, during the gradual turn, the robot approaches the boundary to a predetermined closest distance before receding from the boundary.

16 Claims, 8 Drawing Sheets

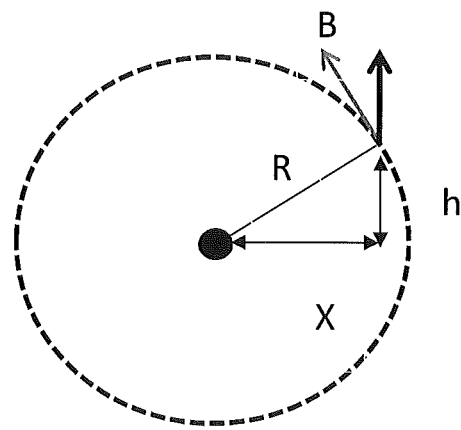
Figure 10
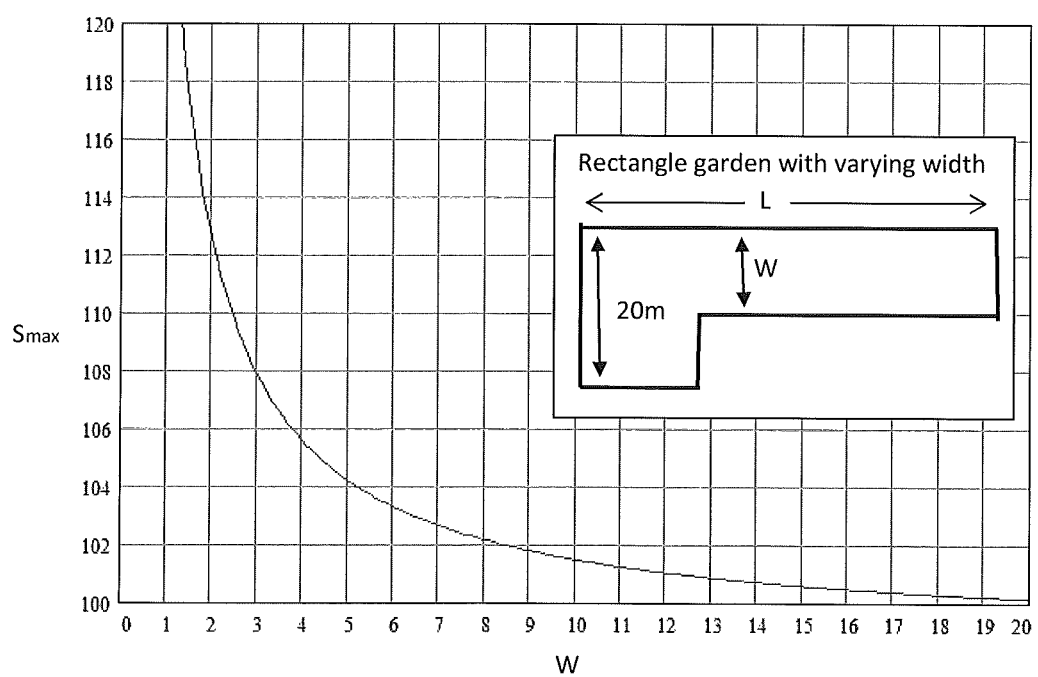
Figure 11 – Relative $S_{max}$ vs loop width (W)

DOMESTIC ROBOTIC SYSTEM AND ROBOT THEREFOR

CROSS-REFERENCE TO RELATED APPLICATIONS

This application claims priority to United Kingdom patent application GB1306437.3, filed Apr. 9, 2013.

TECHNICAL FIELD

The present invention relates to a domestic robotic system and a robot therefor, and may find particularly beneficial application with, for example, systems including a robotic lawnmower, a robot designed for vacuum cleaning, floor scrubbing, snow removal, maintenance and the like.

BACKGROUND

Area coverage by robotic appliances is used in a growing number of applications, such as robotic lawn mowers, robotic vacuum cleaners, robotic window cleaners, robotic painting and the like. In such applications the robot is moving within a working area defined by a boundary, detectable by the robot sensors (such as tactile, optical, electromagnetic sensors etc.) and carries a payload (which may include one or more cutting blades, vacuuming nozzles, rotating brushes, painting brushes etc., depending on the function that the payload is intended to provide) across the entire area until adequately covered. There are various strategies of area coverage, such as random and systematic coverage and various paths of movement used for the actual scanning such as straight lines (either parallel or with varying directions), spirals etc.

An important part of the scanning is the borders handling: the movement the robot performs when the boundary is detected. Commonly used strategies include stopping the robot once the boundary is detected, and then to either turn to a different direction and move forwards in that direction, or to reverse along the original direction. All these strategies are time consuming and, in fact, the total time spent on the boundary handling in some applications may take on average about 10-15% of the total scanning time.

SUMMARY OF THE INVENTION

Thus, in accordance with a first aspect of the present invention there is provided a domestic robotic system comprising: a robot, programmed to move within a working area defined by a boundary; the robot having one or more boundary distance sensors for estimating the current distance from said boundary;
wherein the robot is programmed so as to: (a) move across the working area and, (b) when the one or more boundary distance sensors indicates that the robot is a distance X away from the boundary and is approaching the boundary, begin performing a gradual turn, the gradual turn being such that: the robot progressively changes direction while continuing to move across the working area; and the robot transitions from approaching the boundary to receding from the boundary; and wherein the robot is further programmed so as to: (c) calculate a path for the gradual turn such that, during the gradual turn, the robot approaches the boundary to a predetermined closest distance, E, and thereafter recedes from the boundary.

By performing a gradual turn, as defined above, the time the robot spends at the boundary may be reduced and, in embodiments, may be kept to a minimum. Hence, systems according to the present invention may improve the coverage time and reduce energy usage by the robot.

Further, embodiments of the present invention eliminate the robot from making frequent stops at the boundary to change a drive direction. By eliminating such frequent stops, less stress is applied on the drive gears and motors, which typically prolongs their lifetime. In embodiments of the system as defined above, as the robot progressively changes direction while continuing to move across the working area, the stress applied on the drive system of the robot may be reduced, thus improving the lifetime of the robot and/or allowing lower cost components to be used.

Embodiments according to the present invention may therefore improve the coverage time, save energy and reduce the stress on the drive system thus extending its lifetime or allowing the use of lower cost components.

BRIEF DESCRIPTION OF THE DRAWINGS

The present invention will now be described with reference to the drawings, in which:

FIG. 10 is a diagram illustrating the action of a magnetic field sensor which may be included in embodiments according to the present invention;

FIG. 11 is a graph of the strength of the signal produced by the sensor of FIG. 10 when utilised within a particular embodiment of the present invention;

DETAILED DESCRIPTION OF THE DRAWINGS

Figure 1:
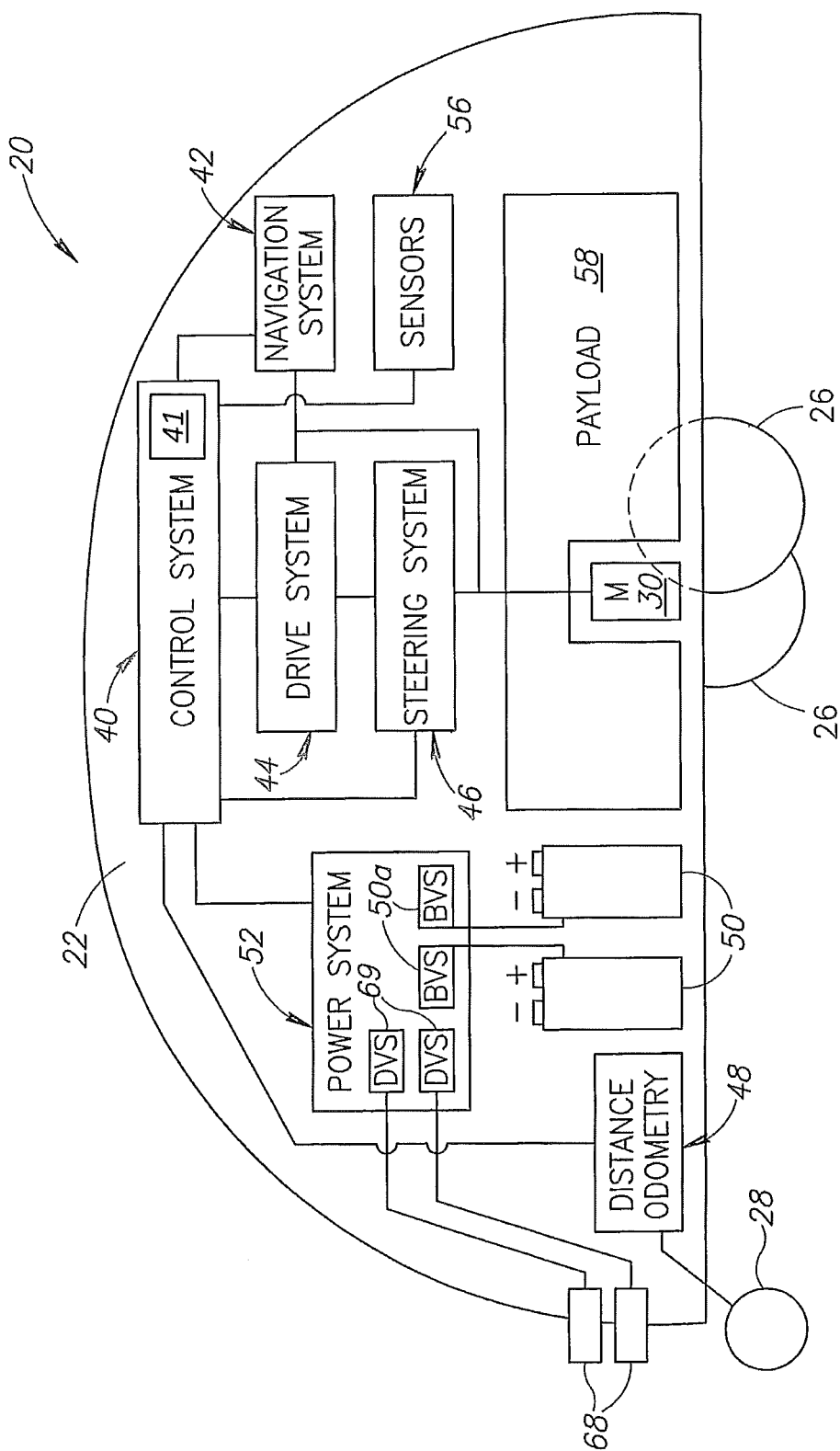
FIG. 1 is a schematic diagram of a robot, which may form part of a domestic robotic system according to the present invention.

There will now be described various embodiments of a domestic robotic system comprising: a robot, programmed to move within a working area defined by a boundary; the robot having one or more boundary distance sensors for estimating the current distance from said boundary; wherein the robot is programmed so as to: (a) move across the working area and, (b) when the one or more boundary distance sensors indicates that the robot is a distance X away from the boundary and is approaching the boundary, begin performing a gradual turn, the gradual turn being such that: the robot progressively changes direction while continuing to move across the working area; and the robot transitions from approaching the boundary to receding from the boundary; and wherein the robot is further programmed so as to: (c) calculate a path for the gradual turn such that, during the gradual turn, the robot approaches the boundary to a predetermined closest distance, E, and thereafter recedes from the boundary.

In certain embodiments of such a system, the path for the gradual turn may be such that, at the predetermined closest distance, the robot is moving substantially tangentially of the portion of the boundary proximal to the robot. Additionally or alternatively, the path of the gradual turn is within the boundary. Suitably, the robot's payload continues to operate during the gradual turn.

Additionally, or otherwise, the robot may be further programmed such that the gradual turn is performed as a single, continuous movement.

The requirement that the robot progressively changes direction while continuing to move across the working area may more particularly require that the whole of the robot is moving across the working area while the robot progressively changes direction. Hence, or otherwise, when viewed from above, the robot may undergo a series of simultaneous translations and rotations during the gradual turn. In embodiments, during one of these simultaneous translations and rotations, no part of the robot will be stationary in a plane parallel to the ground.

In embodiments, the robot may have a footprint having an edge and the value of E may be such that, when the robot is at the closest point to the boundary during the gradual turn, the edge of the footprint is substantially coincident with the boundary. More particularly, the robot may comprise a payload having an active area over which the payload performs its function (for example, where the robot is a robotic lawnmower, this may be the area that is addressed by the blades provided by the payload), the footprint being defined by the active area.

In embodiments, the path calculated in the aforementioned step (c) may be calculated based on the orientation of the robot with respect to a portion of the boundary proximal to the robot. In addition, or otherwise, the path calculated in the aforementioned step (c) may be calculated based on information received from the one or more boundary distance sensors. More specifically, the aforementioned step (c) may be calculated based on the estimate by the one or more sensors of the robot's current distance to a portion of the boundary proximal to the robot.

In embodiments, the aforementioned step (c) may include calculating a radius of curvature (R) for the path of the gradual turn, optionally: wherein the radius of curvature (R) is calculated based on the orientation of the robot with respect to a portion of the boundary proximal to the robot; and/or wherein X has a predetermined value.

Alternatively, the aforementioned step (c) may include calculating the value of X; optionally wherein the value of X is calculated based on a predetermined value for a radius of curvature (R) of the path of the gradual turn and based on the orientation of the robot with respect to a portion of the boundary proximal to the robot.

In addition, or otherwise, the robot may be further programmed so as to: (d) re-calculate the path of the gradual turn at one or more points during the gradual turn, based on information received from the one or more boundary distance sensors corresponding to the one or more points during the gradual turn.

The re-calculations may occur at regular intervals. For example, these one or more points may be either: a fixed time apart; or a fixed distance apart. Hence, or otherwise, the path of the gradual turn may be calculated iteratively by the robot while it is carrying out the gradual turn.

In some embodiments, step (c) may include calculating a radius of curvature (R) for the path of the gradual turn and step (d) may include re-calculating the radius of curvature (R) for the path at the one or more points based on information received from the one or more boundary distance sensors corresponding to the one or more points during the gradual turn;

The robot may also be programmed such that the value of the radius of curvature for the path of the gradual turn cannot fall below a predetermined value ($R_{min}$) during the gradual turn. Again, this may improve the overall efficiency of the system, may improving the lifetime of the robot and/or may allow lower cost components to be used in the robot.

It will be appreciated that such a radius of curvature for a path may alternatively be considered equivalent to a rate of change of the angle or orientation of the robot with respect to time.

Hence, or otherwise, the gradual turn may comprise a series of steps, with the robot turning by an angle $\Delta\alpha$ between consecutive steps, where the value of $\Delta\alpha$ is calculated based on the estimate by the one or more sensors of the robot's distance to the boundary at that point in the gradual turn. Suitably, each of the steps has a substantially straight line path. The steps may be infinitesimal, so that the path of the gradual turn appears to be substantially smooth.

Suitably, the one or more sensors may be further operable to estimate the robot's current angle with respect to a portion of the boundary. Thus, the value of $\Delta\alpha$ may be calculated based on the sensor's estimate, at that point in the gradual turn, of at least one of: the robot's distance to the boundary; and the robot's angle with respect to a portion of the boundary. More particularly, the relevant portion of the boundary may be the portion of the boundary closest to the one or more sensors. In other cases the relevant portion of the boundary may be the portion directly in front of the robot. Alternatively, the relevant portion may be that which is intercepted by the robot's current direction of movement.

Suitably, the steps each typically last for the same length of time $\Delta t$ and in some embodiments the robot may move at constant speed during the gradual turn. Alternatively, the steps may be of the same physical length and/or the robot's speed may vary.

In some embodiments, every value of $\Delta\alpha$ may be equal to or greater than a minimum value. This minimum value may correspond, for example, to movement along an arc of preferred radius. Additionally, or otherwise, every value of $\Delta\alpha$ may be strictly less than 90 degrees, preferably less than 60 degrees, more preferably less than 30 degrees and still more preferably less than 15 degrees. The maximum value may be chosen so as to ensure that the turn is not so tight as to compromise the efficiency of the area coverage.

Suitably, during the gradual turn the robot does not reverse direction. Thus, only forward movement may be involved. Additionally, or otherwise, the robot does not stop during the gradual turn. Thus, for the whole of the path of the gradual turn, the robot may be both translating and rotating.

In embodiments, the robot further comprises two drive wheels. In such cases, during the gradual turn both of the wheels move only forwards, but by different amounts, to traverse different arc lengths. Thus, it may be the case that, during the gradual turn, neither of the wheels moves in reverse. In certain embodiments one or both of the wheels may stop during the gradual turn (albeit briefly). Preferably, however, during the gradual turn the drive wheels move continuously; in other words, without stopping.

It may also be desirable that, for the whole of the gradual turn, the rate of movement of one wheel is greater than the other wheel. Typically this will imply that the one wheel covers a greater distance than the other and that it may therefore be considered to describe the outside of a curved path.

The predetermined distance may have a non-zero value so that the robot is spaced apart from the boundary by the predetermined distance. In embodiments the sensor defined above may indicate the distance between the closest points of, respectively, the boundary and the robot. The distance as measured by the sensor may be such that a zero valued distance corresponds to a portion of the robot—specifically, the portion of the robot closest to the boundary—approximately overlying, or being approximately co-located with the boundary.

In some embodiments, for the whole of the path of the gradual turn, the centre of a radius of curvature lies away from the robot. More particularly, at any point on the path of the gradual turn, the end point of a normal line to the path, with length equal to the radius of curvature at that point of the path, will always lie away from the robot. Still more particularly, the end point lies away from the footprint of the robot (according to any of the definitions provided below). Thus, it may be the case that, while the gradual turn may in certain situations describe a complex path, with the radius of curvature varying along the path, the radius of curvature is always sufficiently large that the centre of the robot's turning circle is spaced apart from the robot, and more specifically apart from the footprint of the robot (according to any of the definitions below). Alternatively, the gradual turn may be defined such that the robot does not overlie the centre of the turning circle at any point during the gradual turn.

Suitably, for the whole of the path of the gradual turn, the radius of curvature is greater than half the width of the robot. Alternatively, or additionally, the average radius of curvature for the path is greater than half the width of the robot.

The width of the robot may be defined as the width of the footprint of the robot. The relevant footprint may be that of the housing of the robot (particularly where the boundary is a hard boundary, such as a wall, that the robot physically cannot cross). In other embodiments, the width of the robot may be defined in terms of the portion of the robot that contacts the floor. Defined differently, the relevant footprint may that of the portion of the robot that contacts the floor. In embodiments this will correspond to the footprint of the wheels of the robot. Hence, or otherwise, in some embodiments the relevant footprint may be that of the drive system of the robot. In other embodiments the width of the robot may be defined as the width of the wheelbase of the robot. Thus, it may be the case that, the relevant footprint may be that of the wheelbase of the robot. In other embodiments the width of the robot may be defined as the width of the axle track of the robot. Thus, it may be the case that, the relevant footprint may be that of the axle track of the robot. In still other embodiments, the radius of curvature may be greater than half the width of the larger of the wheelbase and the axle track of the robot. In still further embodiments, the width of the robot may be defined as the width of the payload of the robot and, more particularly, the portion of the payload that acts on the working area (such as the cutting blade, in the case of a robotic lawnmower, or the vacuum nozzle in the case of a robotic vacuum cleaner). Thus, it may be the case that, the relevant footprint may be that of the payload of the robot and, more particularly, the portion of the payload that acts on the working area. In embodiments the radius of curvature is greater than the width of the robot (according to any of the above definitions).

In embodiments, the path of the gradual turn is such that, at the point of closest approach to the boundary, the sensor indicates that the distance to the boundary is approximately half the width of the robot. In effect this may mean that the part of the robot closest to the boundary approximately overlies the boundary, is approximately co-located with the boundary or is adjacent the boundary (for example within 5 cm or so of the boundary).

Additionally or otherwise, the robot may be programmed such that the gradual turn is completed when the sensor indicates that the robot is the predetermined distance away and receding from the boundary. The robot may be further programmed so as to then repeat step (a) above.

In some embodiments the robot is programmed to repeat steps (a) and (b) a plurality of times, so as to scan the working area. During these steps, the robot's payload may be active for substantially the whole time. Thus, the robot's payload may work over substantially the whole of the working area.

In some such embodiments, step (a) defined above may include movement of the robot according to a scanning pattern, and preferably the scanning pattern is repeated a plurality of times at respective locations distributed across the working area so as to scan the working area. The scanning pattern is suitably selected such that it covers a known amount of area that is substantially smaller than a typical working area. This may allow the robot to cover that amount of area very accurately and repeatably. Such locations may be randomly distributed; for example, between the repetitions, or instances of the scanning pattern the robot may move a predetermined or calculated distance across the area, before beginning the next scanning pattern. The direction in which the robot moves between scanning patterns may be randomly determined, so that the robot carries out a random walk. Alternatively, such locations may be planned or calculated so as to cover the area in an efficient manner.

Different scanning patterns could also be used across the working area, rather than simply repeating the same pattern. As noted above, suitable scanning patterns may include spirals or other simple geometric patterns.

In other such embodiments, step (a) may include movement of the robot in a substantially straight line across the working area and wherein, immediately before the robot begins the gradual turn, it is moving across the working area according to step (a) on a first substantially straight line and, upon completion of the gradual turn, it moves across the working area on a second substantially straight line, more preferably wherein the first substantially straight line path is oriented at an angle to the second substantially straight line path, still more preferably wherein the angle is determined according to a probability function.

Hence, or otherwise, the robot may be programmed to move across the working area on a first substantially straight line path prior to the gradual turn and on a second substantially straight line path following the gradual turn. The robot might therefore be considered to have "bounced" off the boundary.

Such a first substantially straight line path may be oriented at an angle to such a second substantially straight line path. In certain embodiments, this angle may be determined according to a probability function. Thus, the direction in which the robot recedes from the boundary may be random. In other embodiments the angle may be determined mathematically, that is to say deterministically. For example, the robot may be programmed such that it departs the boundary at the same angle that it arrives.

In other embodiments, the first substantially straight line path may be parallel to the second substantially straight line path. Thus, the robot may cover the working area in a plurality of parallel scanning lines.

In some embodiments, particularly where the scanning is at least partially randomly determined, steps (a) and (b) may be repeated for a certain period of time, the period of time being such that there is a high probability that the whole of the working area will have been scanned within the period of time.

The sensor defined above may be said to provide an estimate of the robot's current distance from the boundary. As will be explained in detail in the following disclosure, certain types of sensors will be particularly susceptible to errors in specific situations. In particular, the estimation of the robot's distance may decrease in accuracy in the vicinity of corners of the working area.

Such errors may be a particular issue where the at least one boundary delimiter comprises a boundary wire loop, a voltage signal being applied during use of the system to the boundary wire loop so as to generate a wireless boundary signal. Such a system may suitably further comprise a signal generator operable to apply the voltage signal to the boundary wire loop. In addition, the robot's sensor may be a magnetic or electric field sensor.

Hence, or otherwise, the robot may be further programmed to enter a perimeter following mode. During this mode the robot may follow a path adjacent the boundary or may be spaced by a fixed distance from the boundary. During this mode, the robot may suitably be programmed so that it does not perform any gradual turns (as defined above) whether or not the sensor indicates that the robot is the predetermined distance away from the boundary and is approaching the boundary.

As a result, or otherwise, the robot may be further programmed to carry out a circuit (or circumnavigation or lap) of the working area. Such a circuit may cover portions of the area near to the boundary that would otherwise be covered ineffectively or inefficiently by the robot. While such a circuit is carried out the robot may suitably be programmed so that it does not perform any gradual turns (as defined above) whether or not the sensor indicates that the robot is the predetermined distance away from the boundary and is approaching the boundary.

Where the robot has a footprint having an edge and the value of E may be such that, when the robot is at the closest point to the boundary during the gradual turn, the edge of the footprint is substantially coincident with the boundary. More particularly, the robot may comprise a payload having an active area over which the payload performs its function (for example, where the robot is a robotic lawnmower, this may be the area that is addressed by the blades provided by the payload), the footprint being defined by the active area.

It will, of course, be appreciated that the robot may carry out such a circuit for other reasons; for example, the circuit may enable the robot to map the working area. This may, for example, enable the robot to optimize the scanning of the area; it may in addition or otherwise allow the robot to identify "trouble-spots" within the working area.

The circuit may follow a path adjacent the boundary or may be spaced by a fixed distance from the boundary. More specifically, where the robot has a footprint having an edge, the path may be such that a portion of the edge is substantially coincident with the boundary for the whole of the path, or a substantial portion thereof. As noted above, the robot may comprise a payload having an active area over which the payload performs its function (for example, where the robot is a robotic lawnmower, this may be the area that is addressed by the blades provided by the payload). In such a case, the footprint may be defined by this active area.

In embodiments, the robot may be programmed to carry out one or more further circuits of the working area, each of which circuits preferably follow a path spaced by a respective fixed distance from the boundary, with this fixed distance increasing between consecutive circuits.

Where the path travelled by the robot is referred to herein, this may, in some embodiments, be defined as the path taken by one of the one or more boundary distance sensors. Where there are several boundary distance sensors, the path travelled by the robot may, be defined as the path taken by the centroid of the boundary distance sensors. In other embodiments the path travelled by the robot may be defined as the path taken by the centroid of the footprint of the robot and, in particular embodiments where the robot is provided with a payload, the path travelled by the robot may be defined as the path taken by the centroid of an active area over which the payload performs its function.

Figure 2:
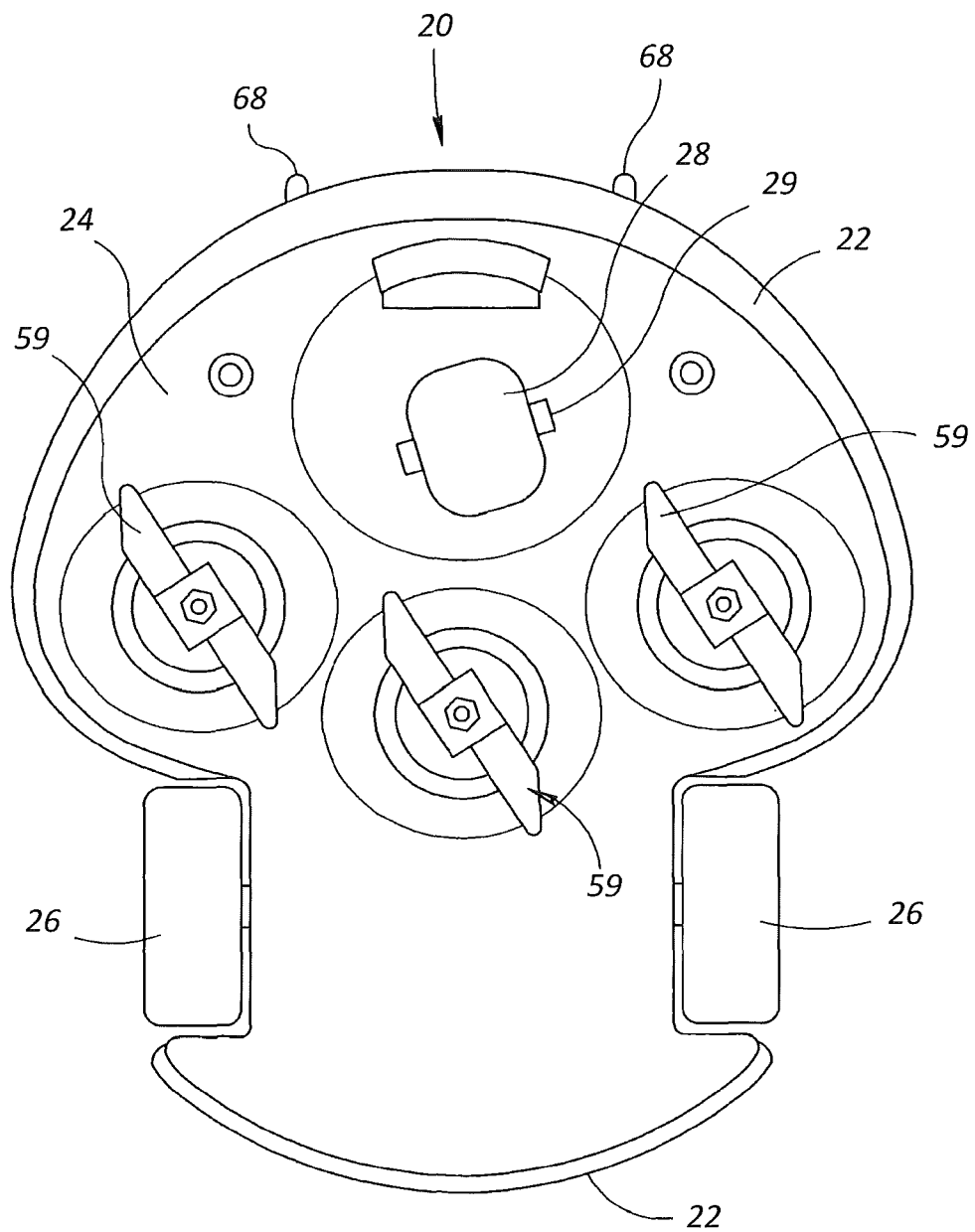
FIG. 2 is a view from below of the constructional features of the robot of FIG. 1.

FIGS. 1 and 2 detail a robot 20 suitable for operation as part of the domestic robotic system 10 according to the present invention.

The control system 40 for the robot 20 is shown in FIG. 1, which is a block diagram showing the relationship of the components, but it will be appreciated that each of the components may be electrically linked or coupled to any other component for proper operation of the robot 20.

The control system 40 includes a main board, and all electronics, as hardware, software and combinations thereof and other components, necessary for the robot 20 to perform all of its operations and functions (known as the main board electronics). The main board includes one or more processors 41, and, for example, a microprocessor, as part of the main board electronics.

As may also be seen from FIGS. 1 and 2, the robot 20 typically includes a body 22, supported by a chassis 24 that supports various mechanical and electrical components, and systems involving these components. As is also visible form FIG. 1, the body 22 and chassis 24 ride on driven wheels 26 28, rollers or the like, that with the related electronics, components and systems, as detailed below, as well as combinations thereof, form a movement system for the robot 20 (for moving the robot over a surface or the like).

A drive system 44 coupled to the driven wheels 26 is electrically coupled to the main board. The electronics of the main board, coupled with the drive system 44, may function, for example, in moving the robot 20 within the working area, as well as moving the robot 20 toward and back into the working area, including specific sections of the working area, from outside the working area, mapping a working area or section thereof, and moving between sections of the working area.

In the robot 20 shown in FIGS. 1 and 2, there are two oppositely disposed wheels 26 at the sides of the robot 20, each driven by motors 30 (independent of each other), to allow for steering of the robot 20. There is also one non-motorized or passive wheel 28, at the front of the robot. As will be explained in greater detail below, this wheel 28 may be used to measure distance, direction and the like as part of a distance measuring/odometry system 48.

The motors (M) for the driven wheels 26 are typically computer controlled, specifically by the control system 40, more specifically still by the processor(s) 41 thereof. The motorized 26 and/or non-motorized 28 wheels may be part of a navigation system 42, a drive system 44, a steering system 46. More particularly, the drive system 44 may control the steering system 46. All of the aforementioned systems are integrated and are typically part of and controlled by the control system 40, and allow for movement of the robot 20 as well as performing the processes and methods detailed below.

As may be seen more clearly from FIG. 2, which is a view of the robot 20 from below, the front wheel 28, whose axle 29 extends into a vertical rod section, is slideably mounted in a vertical orientation in a well in the body of the robot. Within the well is a sensor (not shown) that detects wheel position and, more specifically, the orientation of the wheel, by detecting the position of the vertical rod section. There may also be provided a sensor on the front wheel that counts the number of revolutions of the wheel. These sensors form part of the distance measuring/odometry system 48, which is integrated with and controller by the control system 40. The distance measuring/odometry system 48 is therefore able to measure the direction in which the robot is currently moving as well as measuring the distance the robot travels along the ground. The sensors of the distance measuring/odometry system 48 may be electrical contact sensors, ultrasonic or light sensors, or any other suitable sensors.

The front wheel 28 of the robot may be slideably mounted in a vertical orientation such that, when the axle/rod section, on which the front wheel 28 is mounted, slides or drops downward to a predetermined level (also caused by lifting the body 22 of the robot 20 at its front end), the rod section moves out of contact with the sensor provided within the well of the body 22 of the robot. In response, the requisite components of the control system 40 signal the drive system 44 to stop movement of the robot. This may safeguard the user from harm, particularly where the payload includes moving components and specifically blades 59 (for example in the case of a robotic lawnmower).

The robot 20 also includes a payload 58, coupled to the control system 40. This payload 58 can be designed for various tasks. In the robot shown in FIG. 2, the payload 58 is designed for lawn mowing. There are therefore a number of blades 59 provided on the underside of the robot 20, which may be seen in FIG. 2.

However, it will be appreciated that the payload 58 can also be designed for vacuum cleaning, surface cleaning, floor sweeping, snow and debris removal, floor scrubbing, maintenance and the like. The robot 20 shown is a robotic lawnmower, as its payload is designed for lawn mowing. As may be seen more clearly from FIG. 2, the robot 20 is therefore provided with a number of blades that are powered by a motor (not shown) situated within the chassis.

The robot 20 is typically powered by an internal power supply (including batteries 50, typically rechargeable) that forms part of a power system 52, which is electrically coupled to the control system 40. Battery voltage sensors 50*a*, typically for each battery 50, are also part of the power system 52.

The robot 20 may be designed such that it can be received by a docking station (not shown) which the robot 20 will return to once its task is complete (e.g. for orderly control and arrangement of the robot). Such a docking station may form a part of a domestic robotic system 10 according to embodiments of the present invention. While in this docking station, various functions can occur, such as battery recharging and the like.

The robot 20 shown in FIGS. 1 and 2 therefore includes docking contacts 68 (transmission parts for the transmission of energy, electricity, signals, or the like), extending forward or laterally from the front side of the robot 20. These docking contacts 68 are typically metal or other magnetic or electrically conducting materials. These docking contacts 68 are electrically coupled to the control system 40, for example, through the power system 52. Voltage sensors (DVS) 69, typically for each of the docking contacts 68, and electrically coupled to the docking contacts 68 and the control system 40, and are also typically part of the power system 52.

This electrical linkage allows for charging of the batteries 50 of the power system 52 once a sufficient contact is made between the docking contacts 69 and the docking station. This may be determined by the control system 40, for example by detecting whether there is at least a threshold voltage of, for example, as least 25 Volts, on the docking contacts 68, as measured by the voltage sensors 69.

The docking contacts 68 are typically parallel to the horizontal or ground surface. These docking contacts 68 protrude from the body 22 of the robot (examples of suitable docking contacts are described in detail in U.S. patent application Ser. No. 10/588,179 and PCT/ILO5/00119).

As shown generally by FIG. 1, the robot 20 also includes sensors, for example, for detecting the distance to a boundary S1, S2, for obstacle detection, obstruction detection, absolute and/or relative position detection, boundary detection, proximity detection to objects and/or boundaries. These sensors form a sensor system 56, which is coupled to the control system 40, and are under the control thereof.

Figure 3:
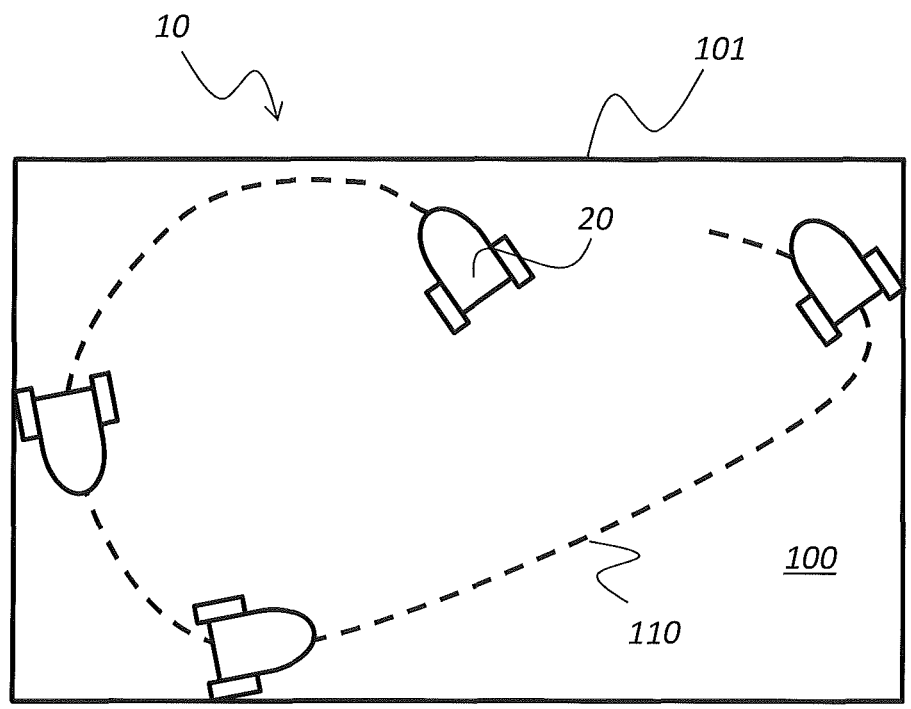
FIG. 3 illustrates a domestic robotic system according to a first embodiment of the present invention, where a robot scans a working area by travelling on a number of paths at different scanning angles.

Such a robot 20 typically operates within a working area 100 or other bounded area, along a ground surface, as shown, for example, in FIG. 3. This working area 100 will generally be defined by a boundary 101 (the term "boundary", when used in this document is an indicator of the limit of an area). In some cases, this boundary 101 may be defined by a delimiter (a boundary marker), which may also form a part of a domestic robotic system 10 according to the present invention.

An example of such a boundary delimiter or marker is a wire arranged around the perimeter of the working area to define a perimeter wire or a perimeter wire loop (perimeter wire, perimeter wire loop, and perimeter loop used interchangeably herein). The wire may be proximate to the ground surface, but is usually buried in the ground.

Such a perimeter wire loop is typically received in a signal generating unit (not shown), which may also form a part of a domestic robotic system 10 according to the present invention. The signal generating unit generates signals utilized by the robot 20 for multiple functions, in particular, to determine the specific location of the robot within the working area 100 or outside of the working area 100. The perimeter wire loop defines a closed pathway over which the signal(s) generated by the signal generating unit travel.

As will be described in further detail below, the robot 20 receives and detects these signals using sensor system 56 and, based on this receipt, the robot's location with respect to the boundary 101 may be determined. The wire of the perimeter wire may be of metal or other electrically conductive metal wire. The wire for the perimeter wire may be for example, PERIMETER WIRE for the Robomower, commercially available from Robomow (the trading name of the owner of this patent application) of Pardesyia 42815, Israel.

In other cases, the boundary 101 of the working area 100 may be defined by a natural delimiter, in the sense that the working area 100 is defined by objects or features that are already present at or adjacent the working area and so the user need not be provided with components specifically designed for use with the robot 20. Such natural delimiters might include hard delimiters, such as a fence or, where the robot 20 is designed for vacuum cleaning, the walls of the rooms. In other cases, such natural delimiters might include "soft" delimiters, in the sense that the robot 20 is physically able to cross such boundaries, for example, the edges of a lawn.

In still other cases, the boundary 101 may be "virtual", in that it is defined by co-ordinates stored, for example, by the navigation system 42 of the robot 20, thus giving a "map" of the working area 100.

It will also be understood that, even where a boundary delimiter is present, the control system 40 of the robot 20 may be programmed so as to move the robot 20 within the working area 100 so as to generate such a "map" of the working area 100 (and specifically the co-ordinates of the boundary 101) to be stored by the navigation system 42 of the robot 20.

The operation of a robot 20 similar to that shown in FIGS. 1 and 2 in a domestic robotic system 10 according to embodiments of the present invention will now be described with reference to FIGS. 3 to 13.

In these embodiments, the processors 41 of the control system 40 of robot 20 are programmed such that the robot 20 (which forms part of the domestic robotic system 10) may move within the working area so as to continuously scan the working area 100, with few or substantially no stops occurring at, or adjacent to the boundary 101.

Further, in these embodiments, the sensor system 56 of the robot 20 includes one or more boundary distance sensors $S_1$, $S_2$, which provide the control system 40 with an estimate of the robot's current distance from the boundary 101.

Examples of suitable sensors S1, S2 for estimating the current distance from the boundary 101 (or the delimiter of the boundary 101) include:

One or more coils which can sense a magnetic field induced by a wire loop delimiter transmitting an alternating current (the magnetic field strength is inversely proportional to the distance from the wire);

Range finders (such as ultrasonic or laser), which can measure a distance from a hard delimiter such as a fence or wall;

Machine vision systems that can evaluate a distance to marked or natural delimiters;

3D cameras, which are able to measure distances by time of flight or stereometry, or structured light stereometry (where a known pattern—typically a grid—is projected on to the working area, or its surrounds, and the deformation of the of pattern is analysed so as to calculate the distance and shape of features in the working area and its surrounds);

RF range finders (such as Ultra Wide Band—UWB) that measure time of flight between a receiver and a transponder (the receiver may be provided on the robot and the transponder on the ground, or vice versa) and Navigation systems (such as GPS) that can provide the robot's co-ordinates in relation to pre-defined delimiter co-ordinates (for example the robot 20 can perform an initial mapping operation where it carries out a circuit of the boundary 101 and records the co-ordinates thereof).

Figure 4:
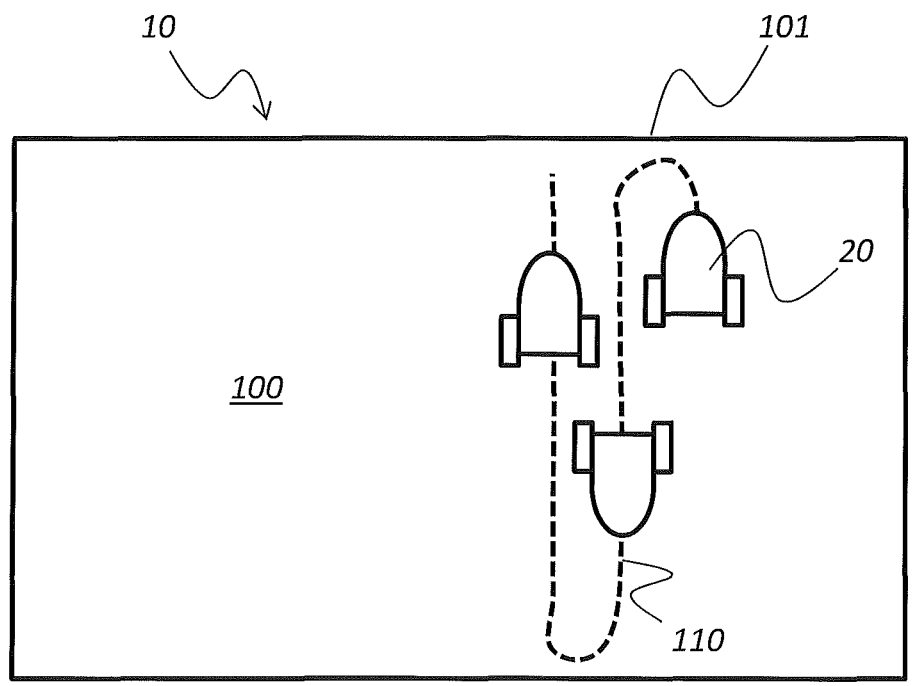
FIG. 4 illustrates a domestic robotic system according to a further embodiment of the present invention, where a robot scans a working area by travelling on a number of parallel paths.

FIGS. 3 and 4 show two such embodiments: in both FIGS. 3 and 4, the robot 20 moves across a working area 100, which may be a garden (for a robotic lawnmower) or a room (for a robotic vacuum cleaner). The payload 58 within the robot 20—for a robotic lawnmower, the cutting blade system, for a robotic vacuum cleaner, the vacuum suction and/or brush system—may be active during this movement. The control system 40 of the robot 20 (and specifically the processors 41 thereof) may be programmed with a scanning pattern for movement across the area; in the embodiments shown in FIGS. 3 and 4 this scanning pattern is simply movement along a straight line path, but could include movement along a path with a geometric pattern, such as a spiral, that covers a known amount of area. The control system 40 of the robot 20 (and specifically the processors 41 thereof) may be programmed to repeat such a pattern a large number of times over the area, with the robot 20 moving to a different location for each repetition.

As may be apparent from FIGS. 3 and 4, the control system 40 of the robot 20 is programmed such that when the robot 20 is a certain distance away from the boundary 101 and is approaching the boundary 101, the robot 20 begins performing a gradual turn, the gradual turn being such that: the robot progressively changes direction while continuing to move across the working area 100; and the robot 20 transitions from approaching the boundary 101 to receding from the boundary 101. As a result, the robot stays within the boundary 101, avoiding any unintended operation of the payload 58 outside of the working area 100 (such as unintended cutting by blades 59, which could represent a danger to the user). While carrying out the gradual turn, the robot's payload continues to operate (for example, a robotic lawnmower would continue to mow the lawn).

As may also be seen from FIGS. 3 and 4, the gradual turn does not include any abrupt changes in direction or drastic manoeuvres, such as a 180 degree turn at the boundary 101. This may result in reduced wear on the robot, and particularly on the drive system 44 and steering systems 46, thus increasing the lifetime of the robot.

In more detail, during operation of the robot 20, the control system 40 is able to receive information in the form of signals from the sensor system 56, including the aforementioned boundary distance sensors. The processors 41 of the control system 40 of the robot 20 are able to use the information provided by the boundary distance sensors to calculate the path of the gradual turn so that when the gradual turn is carried out (by means of the drive system 44 and the steering system 46, under the influence of the control system 40) the robot's path or trajectory 110 approaches the boundary to a predetermined closest distance, E. In addition, at the point of closest approach, the path of the gradual turn may be tangential to the boundary 101.

Figure 5:
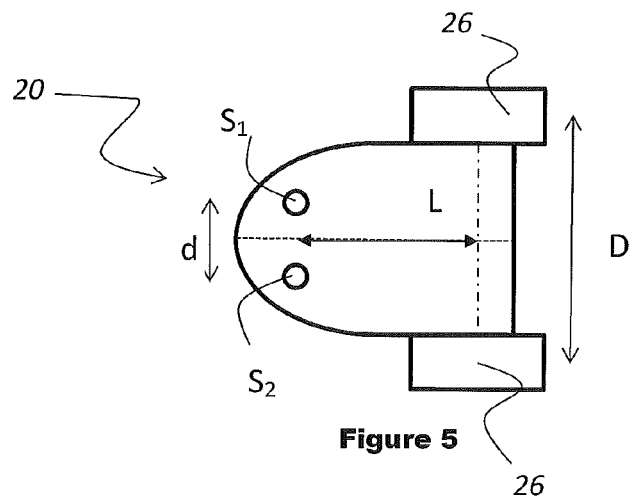
FIG. 5 is a schematic representation the drive and sensor system of a robot for use in the systems of FIGS. 3, 4, 6 and 9.

FIG. 5 shows in further detail a robot 20, similar to that illustrated in FIGS. 1 and 2, where the sensor system 56 includes two boundary distance sensors S1 and S2. In the specific embodiment shown, the boundary distance sensors are coils that can sense the magnetic field induced by an alternating current signal in a perimeter wire loop that defines the boundary 101, but, as noted above, a number of other boundary distance sensors may be suitable.

Further, in the particular embodiment of FIG. 5, the distance between the sensors is d and the distance between the centre line of the sensors and the centre line of the drive wheels (the robot's centre of rotation) is L. FIG. 5 also shows the distance between the drive wheels D (commonly referred to as the axle track), which in the illustrated robot 20 define the widest extent of the robot.

As the robot 20 moves across the area, in a similar manner to that shown in FIGS. 3 and 4, the sensors S1 and S2 can sense whether the robot 20 is approaching or receding from the boundary 101, as the estimated distance from the boundary 101 will be determined by the processors 41 of the control system 40 to be, respectively, decreasing or increasing. When the boundary distance sensors S1 and S2 indicate that the distance to the boundary 101 has decreased below a predetermined threshold—and so the robot 20 is a predetermined distance away from the boundary 101 and approaching the boundary 101—the control system 40 is programmed to break from the normal area coverage behaviour (the scanning pattern for movement across the area) and begin instead directing the drive system 44 and steering system 46 to perform a gradual turn. In some cases, the turn may be "gradual" in that the control system 40 directs the drive system 44 and the steering system 46 to operate such that both of the wheels 26 continue forward movement for the whole of the gradual turn, but at different rates.

As may be seen from FIGS. 3 and 4, while carrying out the gradual turn, the robot 20 progressively changes direction while continuing to move across the working area 100. Seen from above, the gradual turn may in some cases be seen as a series of simultaneous translations and rotations. It will be appreciated that, during such a simultaneous translation and rotation, no part of the robot 20 will be stationary in a plane parallel to the ground. Thus, assuming that the robot 20 carries out such a gradual turn without stopping, it may be said that, for the whole of the path of the gradual turn, the robot 20 is both translating and rotating.

Over the course of the gradual turn the sensor reading will at first indicate that the distance to the boundary is decreasing; the reading will continue to decrease until the robot 20 reaches the point of closest approach to the boundary 101, whereupon the sensor reading will tend to reach a minimum value. As the robot 20 continues the gradual turn, the control system 40 will cause the drive system 44 and steering system 46 to act such that the direction of movement of the robot 20 progressively angled away from the boundary 101. As a result, the sensor reading will begin to increase once more. During the course of the gradual turn the robot's payload 58 may remain active, so that, for example, where it is a robotic lawnmower the blades 59 continues to cut grass.

Once the sensors S1 and S2 indicate that the distance has risen above a threshold value, the robot 20 may resume its normal area coverage behaviour, returning to carrying out the scanning pattern for movement across the area discussed above. In both FIGS. 3 and 4 this corresponds to moving across the area on a straight line path.

The embodiments shown in FIGS. 3 and 4 differ, however, in that in FIG. 3 the area is scanned using different scanning angles, whereas for FIG. 4 the area is scanned keeping parallel trajectories. More particularly, in the embodiment of FIG. 3, the angle at which the robot 20 departs from the gradual turn is randomly determined by the processor(s) 41 of the control system 40, so that the robot 20 might be considered to "bounce" at random within the boundary.

In practice, this may be accomplished by programming the processors 41 of the control system 40 to use suitable values for the threshold at which the robot resumes normal area coverage behaviour. For example, for parallel scanning trajectories, as shown in FIG. 4, the threshold at which the robot 20 resumes normal area coverage behaviour may be the same predetermined value as the distance at which the robot 20 switches from normal area coverage to performing the gradual turn. By contrast, for random scanning angles, as shown in FIG. 3, the threshold at which the robot resumes normal area coverage behaviour may be determined by the processor 41 using a random (or pseudo-random) function. In other words, the robot 20 may continue performing the gradual turn until it is a randomly determined distance from the boundary 101 and is therefore at a randomly determined angle to the boundary 101.

Figure 6:
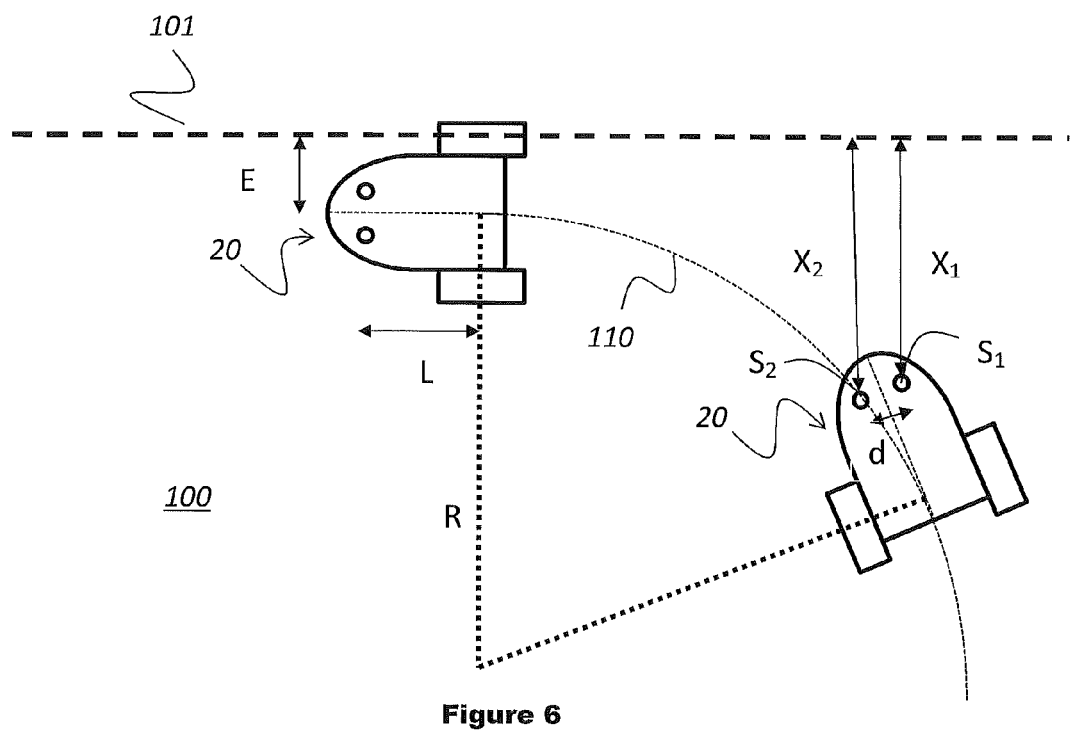
FIG. 6 illustrates the robot of FIG. 5 executing a turn at the boundary that describes an arc.

In some embodiments, such as that shown in FIG. 6, the gradual turn may describe an arc. As will be apparent from the figure, the domestic robotic system 10 of FIG. 6 utilizes a substantially similar robot 20 to that shown in FIG. 5.

In more detail, the control system 40 of the robot 20 is programmed such that, when it reaches a pre-defined distance $X_t$ from the perimeter it starts performing a circular trajectory that is calculated by the processor(s) 41 of the control system 40 to be tangential to the boundary 101 a distance E from it, as shown in FIG. 6.

The value of E may be predetermined and, more specifically, may be such that, when the robot 20 is at the closest point to the boundary 101 during the gradual turn, the edge of the robot's footprint (the area covered by the robot, when viewed from vertically above) is substantially coincident with the boundary. More specifically, the footprint of the robot may be defined as the area over which the payload 58 of the robot 20 is active. For example, with a robotic lawnmower as shown in FIG. 2, this may be the area that is addressed by the blades 59. Thus, at the predetermined closest distance E, the edge of the active area of the payload 58 is coincident (when viewed from above) with the boundary 101. With a robotic lawnmower, this corresponds to the lawn being mowed right to the edge at the predetermined closest distance.

As also shown in FIG. 6, the two boundary distance sensors S1 and S2 provide the control system 40 with two readings ($X_1$ and $X_2$) for the distance of the robot 20 to the boundary 101. The processor(s) 41 of the control system 40 calculate the average of these two distance readings ($X_1$ and $X_2$) from the two distance sensors S1 and S2 and use this average value as an indication of the robot's current distance from the boundary.

Thus, the robot's control system 40 causes the drive system 44 and the steering system 46 to begin the gradual turn when the processor(s) 41 of the control system 40 calculate that $X_t$ is the average between the sensors readings. This can be expressed mathematically in the following manner:

$$X_t = \frac{X_2 + X_1}{2}$$

The radius R of this trajectory 110 can be derived by geometric relations:

$$R = \frac{L * \sqrt{1-k^2} + X_t - E}{1-k}$$

Where:

$$k = \frac{|X_2 - X_1|}{d}$$

The processor(s) 41 of the control system can therefore be programmed to calculate the appropriate radius value R based on the measured values $X_1$ and $X_2$ and on the predetermined values $X_t$ and E.

The two readings ($X_1$ and $X_2$) for the distance of the robot 20 to the boundary 101 effectively enable the control system 40 to estimate or determine the robot's current orientation with respect to the boundary 101. Thus, the processor(s) 41 of the control system 40 are able to calculate a trajectory 110 for the robot 20 that is based on the orientation of the robot 20 with respect to the boundary 101 (specifically, the orientation with respect to the nearmost portion of the boundary 101).

As may be seen from FIG. 6, the value of $X_t$ that has been chosen is sufficiently large that the center of the turn lies away from the robot. To obtain a circular trajectory of the appropriate radius R (which is substantially larger than half the width of the robot), the control system 40 of the robot directs the drive system 44 and steering system 46 such that the left and right drive wheels 26 move with different speeds. Further, the left and right drive wheels 26 are in continuous motion throughout the turn.

Mathematically, the relation between the radius R, the distance between the wheels D, robot velocity V and the difference between wheels' velocities ΔV can be expressed by:

$$R = D\frac{V}{\Delta V}$$

Hence:

$$\frac{\Delta V}{V} = \frac{D(1-k)}{(X_t - E) + L\sqrt{1-k^2}} \qquad \text{Equation 1}$$

The processor(s) 41 of the control system 40 may therefore, given the current or nominal velocity of the robot, calculate the appropriate difference between wheels' velocities ΔV and instruct the drive system 44 and steering system 46 accordingly.

In certain embodiments, the robot 20 may include a sensor that allows the robot's current steering direction to be measured. For example, as discussed above, such a sensor may be provided in the well that receives the axel of the front wheel of the robot, with this sensor detecting the orientation of the front wheel, and thus the steering direction of the robot. As also noted above, such a sensor may form part of the distance measuring/odometry system 48 for the robot 20.

In such embodiments, Equation 1 can be expressed in the following alternative form which defines the required angular movement (Δα) every period of time (Δt):

$$\Delta\alpha = \frac{V\Delta t}{R}$$

Hence:

$$\Delta\alpha = \frac{V\Delta t(1-k)}{(X_t - E) + L\sqrt{1-k^2}} \qquad \text{Equation 2}$$

As before, the processor(s) 41 of the control system 40 may therefore, given the current or nominal velocity of the robot, calculate the required angular movement for every period of time and instruct the drive system 44 and steering system 46 accordingly.

In addition, the processor(s) 41 of the control system 40 may be further programmed such that the calculations detailed above in Equations 1 and 2 may be repeated periodically (for example at regular intervals of time or distance travelled). This may enable the path of the gradual turn to be corrected based on more up-to-date information from the robot's sensor system 56 and/or from the distance measuring/odometry system 48.

Such corrections may therefore take account of, for example, the boundary 101 approaching the robot more quickly than expected and, in response, the radius of the arc of the gradual turn may be decreased. In addition, the control system 40 may be programmed such that, even with such re-calculations by the processor(s) 41, the value of the radius is prevented from dropping below a floor value $R_{min}$, so that the robot 20 is not allowed to turn too tightly.

In one example of re-calculations carried out by processor(s) 41, in Equation 2 above, Δt may be the period between such consecutive angular corrections processor(s) 41 of the control system 40, with the drive 44 and steering 46 systems being instructed accordingly by the control system 40. Thus, the gradual turn executed by the robot 20 may be considered as being made up of a series of steps each lasting the same amount of time Δt, with the robot 20 turning by an angle Δα between consecutive steps, where the value of Δα is calculated by the processor(s) 41 of the control system 40 based on the estimate by the sensors of the robot's distance to the boundary at that point in the gradual turn. As noted above, the control system 40 may also (or alternatively) take account of the robot's current angle with respect to the boundary, for example by updating the value k in the equations above.

Further, the situation where the robot 20 continues along an arc-shaped path may be considered as special case where the value of Δα is constant throughout the gradual turn. The corrections in the value of Δα may therefore be considered as departures from this minimum value of Δα. Conversely, efficiency considerations (specifically, avoiding making the turn too tight) may determine a maximum value for Δα, such as 15 or 30 degrees.

Figure 7:
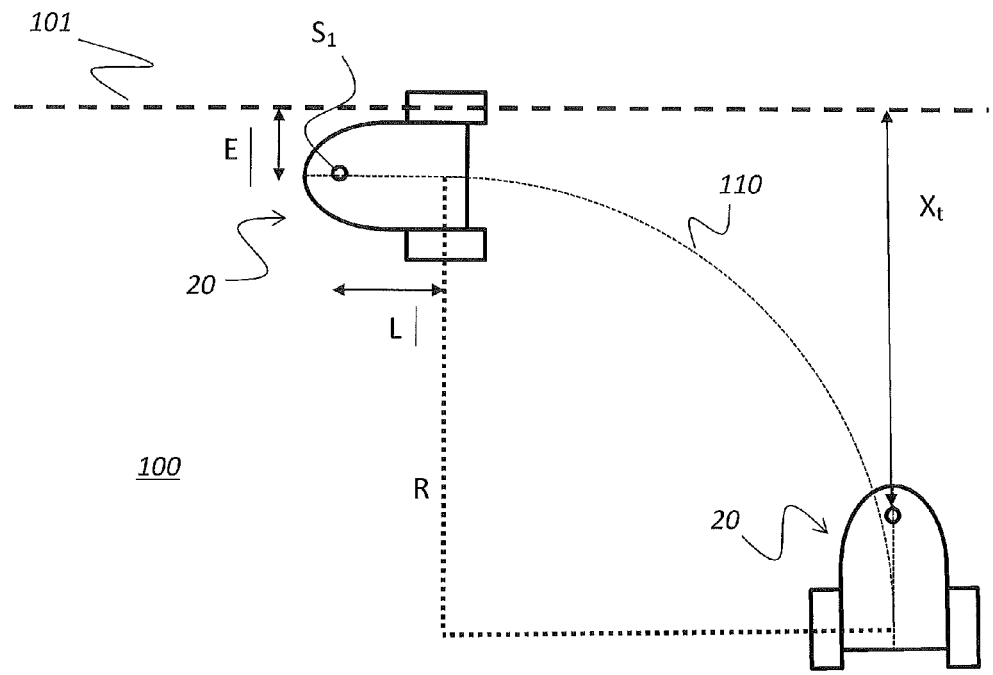
FIG. 7 shows a further embodiment of the present invention that is similar to that of FIG. 6, but in which the robot is provided only with a single boundary distance sensor.

FIG. 7 shows a further embodiment of a domestic robotic system 10 according to the present invention, where the robot 20 is provided with only a single boundary distance sensor S1. With only a single boundary distance sensor S1 the orientation of the robot 20 relative to the boundary 101 may not be determined in the same manner as in FIG. 6.

Therefore, the processors 41 of the control system 40 perform calculations that are based on the assumption that the robot 20 is moving perpendicular to the perimeter. In such a situation, the requisite value of R is determined by the following relation:

$$R = X_t + L - E$$

and therefore:

$$\frac{\Delta V}{V} = \frac{D}{X_t + L - E} \qquad \text{Equation 3}$$

Again, the direction of movement may be periodically corrected so that if the robot 20 is approaching the boundary 101 more quickly than expected (as may be expected, given that the robot 20 is unlikely to in fact be moving perpendicular to the boundary 101 and is more likely to be approaching the boundary 101 at an angle) the processor(s) 41 of the control system 40 of the robot 20 are programmed so that, in response, the radius of the arc may be decreased. In embodiments this might, for example, involve the processor(s) 41 using the current value of the sensor reading (or the average of the sensor readings since the beginning of the gradual turn) at that point in the turn in place of the predetermined value $X_t$ in the above equations.

It will be appreciated that, when the robot 20 in fact approaches the boundary 101 at a nearly parallel angle and at a distance $X_t$ then, owing to the assumption in the calculations carried out by the processor(s) 41 that the robot is approaching perpendicularly to the boundary 101, the resulting arc-shaped trajectory will take it away from the perimeter and an uncovered area of width $X_t$ will remain adjacent that gradual turn.

Nevertheless, when the scanning strategy is continued for a sufficiently long period of time, the robot 20 will eventually cover the uncovered area. For example, in a scanning strategy that utilizes random angle trajectories, the uncovered area may be addressed when the robot 20 approaches that area at a different angle.

While it has been noted above with reference to FIG. 7 that, with only a single boundary distance sensor S1 the orientation of the robot 20 relative to the boundary 101 may not be determined in the same manner as described with regard to FIG. 6, it is possible to determine the orientation of the robot 20 relative to the boundary 101 using different approaches.

Figure 8:
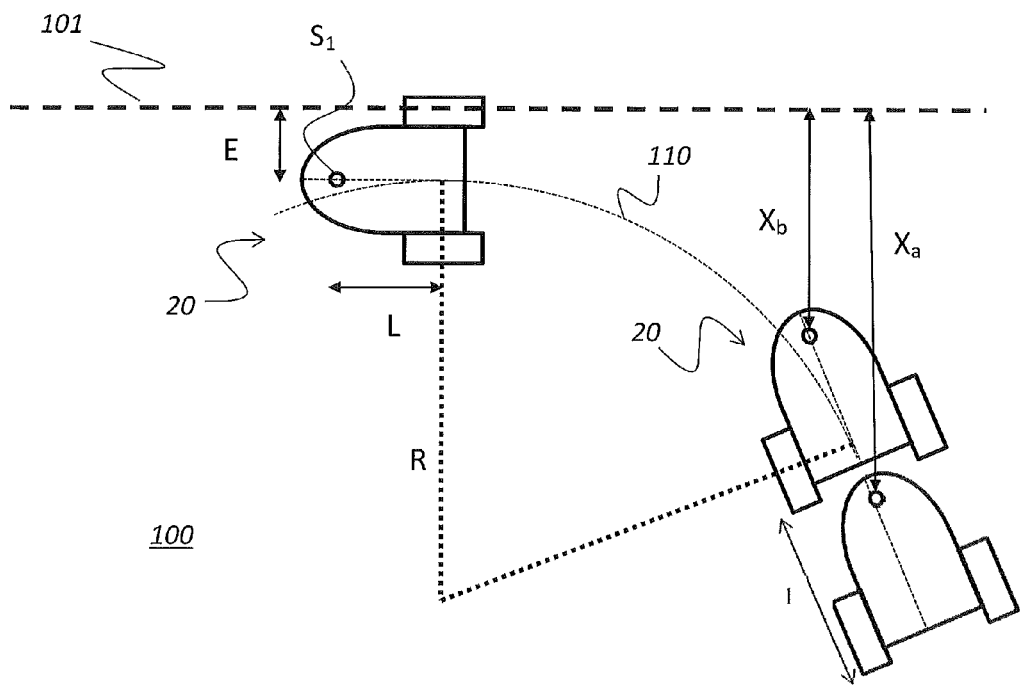
FIG. 8 shows a still further embodiment of the present invention, where, as with that of FIG. 7, the robot is provided with a single boundary distance sensor, but is also provided with a path distance sensor.

FIG. 8 illustrates one such approach, where the robot 20 is provided with a distance measuring/odometry system 48, similar to that described above with reference to FIGS. 1 and 2. As shown in the figure, the robot 20 is initially a distance $X_a$ away from the boundary 101 (as measured by the single boundary distance sensor S1) at a first point, a, and is travelling along a straight-line path. Then, after travelling a distance l along the straight-line path (as measured by the odometer of the distance measuring/odometry system 48), the robot is a distance $X_b$ away from the boundary 101 (again, as measured by the single boundary distance sensor S1) at a second point, b.

If the robot then (at point b) begins a gradual turn having a radius R as shown in FIG. 8, which is calculated by the processor(s) 41 of the control system 40 to be tangential to the boundary 101 a distance E from it, using a similar geometrical analysis to that used above with respect to FIG. 6, it can be shown that the necessary radius R is given by the relation:

$$R = \frac{L * \sqrt{1 - K^2} + X_b - E}{1 - K}$$

Where:

$$K^2 = 1 - \frac{|X_b - X_a|^2}{l^2}$$

The similarity in form to the equations derived above from FIG. 6 is immediately apparent. Hence, a similar relation to Equation 1 for the ratio of the difference between the wheels velocities ΔV to the robot velocity V may be derived:

$$\frac{\Delta V}{V} = \frac{D(1 - K)}{(X_b - E) + L\sqrt{1 - K^2}}$$

This equation may therefore be programmed into the processor(s) 41 of the control system so as to allow a robot to carry out gradual turns as shown in FIG. 8.

As with previous embodiments, the processor(s) 41 may re-calculate the path for the gradual turn while the gradual turn is being carried out, based on more up-to-date information received by the control system 40 from the various sensors of the robot 20. In this particular case, it may be understood that the relations above will hold provided that the calculated value of R satisfies the relation l<<R. Therefore, in order to ensure that the robot does not behave anomalously, the processor(s) 41 of the control system may be programmed such that R is prevented from falling below a specific value $R_{min}$.

Other techniques may be used for measuring the distance between point a and point b. The odometer in the example above may therefore be considered as just one example of a path distance sensor; the robot may equally be provided with an accelerometer or a GPS receiver. In addition, the path distance sensor may be a combination of an odometer and a sensor indicating the orientation of the front wheel 28, as described above with reference to FIGS. 1 and 2. In a further example, the robot's control system 40 may simply measure the time it takes to travel from point a to point b and then, using the known average velocity at which the robot 20 moves, calculate the distance from point a to point b. It will be appreciated that, with a suitable choice of path distance sensors, the robot 20 may not need to initially travel along a straight-line path as described in the example above.

It may be noted at this point that, in the embodiments described with reference to FIGS. 6 to 8, the control system 40 of the robot 20 has been programmed such that the gradual turn is commenced when the robot 20 is a predetermined distance away from the boundary 101, with the appropriate radius for the gradual turn being calculated (by the processor (s) 41 of the control system 40) in dependence upon the robot's distance from the boundary. However, it is also contemplated that the processor(s) 41 of the control system 40 of the robot 20 may be programmed such that the processor(s) 41 calculate the path for the gradual turn based on a predetermined radius for the turn, with the distance at which the gradual turn is begun varying. Such calculations by the processor(s) 41 may also be based on the orientation of the robot 20 with respect to the nearmost portion of the boundary 101 (with the orientation being determined by any of the approaches discussed above). Thus, if the robot 20 is approaching the boundary 101 at a nearly perpendicular angle, the control system 40 may cause the drive system 44 and steering system 46 to being the gradual turn at a greater distance than if the robot was approaching the boundary at a nearly parallel angle, since in the former case the robot must turn much more to move away from the boundary 101.

Figure 9:
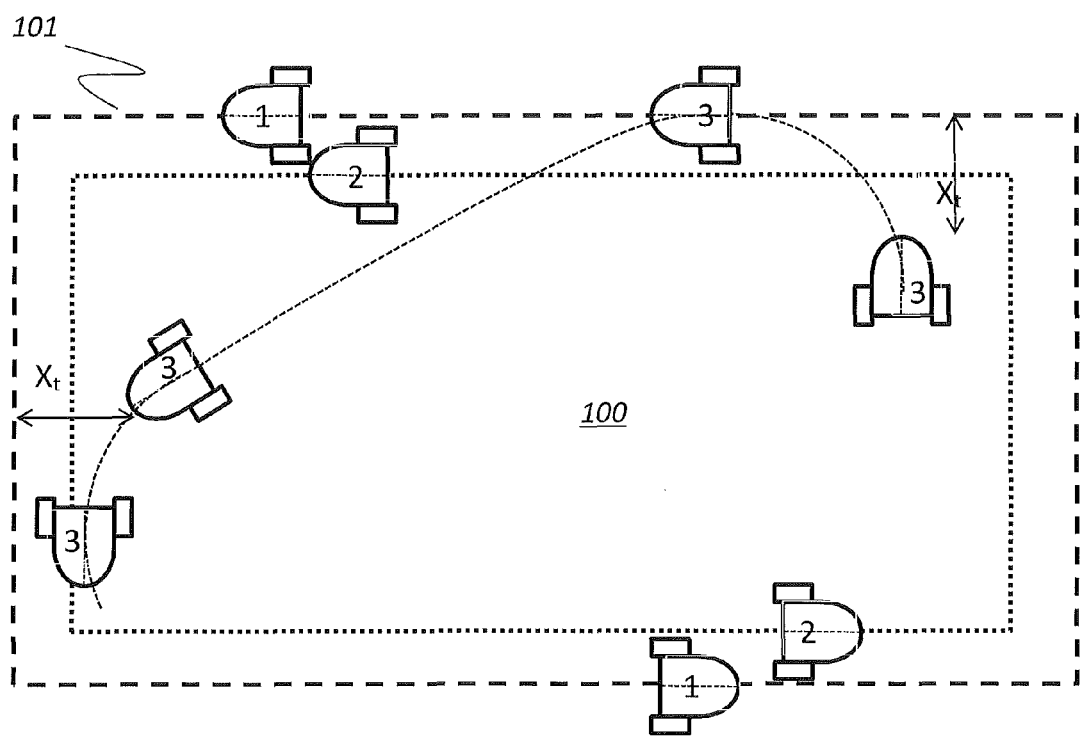
FIG. 9 illustrates a still further embodiment of the present invention where a robot executes a number of circuits of the working area.

In order to further ensure full area coverage (for example, addressing the uncovered areas discussed above with reference to FIG. 7), the processor(s) 41 of the control system 40 of the robot 20 may be programmed so as to additionally perform a series of circuits of the working area, as shown in FIG. 9.

As shown in the figure, each of these circuits follows a path spaced by a respective fixed distance from the boundary, with this fixed distance increasing between consecutive circuits. The outermost circuit may either be on top of the boundary or—particularly where the boundary is a hard boundary such as a wall—a set minimum spacing from the perimeter. Such perimeter following behaviour may be considered as a systematic coverage method for the working area.

Particularly where the calculations of the processor(s) 41 of the control system are based on the assumption that the robot is approaching perpendicularly to the boundary 101, the spacing for inner-most circuit may be such that the edge of the active area of the payload 58 is a distance $X_t$ from the boundary 101. Thus, the circuits will cover all the areas that may have been missed during the initial scanning strategy using the gradual turns.

In more detail, as may be seen from FIG. 9, the distance $X_t$ used by the processor(s) 41 of the control system 40 for the normal area scanning behavior (as opposed to the perimeter following behavior) may desirably be set at a value that takes account of the perimeter coverage scheme. For example, $X_t$ may be the same as the largest spacing value for the perimeter following behavior. Thus, it may be arranged that the area scanning will overlap or will be tangent to the area covered during perimeter following and hence a full coverage will typically be ensured. An example of this may be seen in FIG. 9, where 1 represents the first perimeter trajectory, 2 the second near-perimeter trajectory and 3 the area scanning.

FIG. 10 illustrates diagrammatically a process by which a magnetic sensor may estimate the current distance from a current-carrying wire defining the boundary of the working area. In more detail, to estimate the distance X of a sensor from the wire, to be used in the equations mention above, we consider a sensor of height h at a distance of X from an infinite straight alternating current wire.

The magnetic field B is:

$$B = \frac{\mu_0 * I}{2 * \pi * R}$$

Where I is the current in the wire and $$\mu_0 = 4\pi * 10^{-7} \left[ Tesla * \frac{meter}{Amper} \right]$$

It will be appreciated that the sensor measures only the vertical component of B:

$$B_z = \frac{B * X}{R}$$

Hence, the signal S received by the sensor can be expressed as:

$$S = \frac{2 S_{max} \left( \frac{X}{h} \right)}{1 + \left( \frac{X}{h} \right)^2}$$

Where $S_{max}$ is the signal received at X=h.
Solving for X, we get, for X>h and $$S_{norm} = \frac{S}{S_{max}}:$$

$$X = h \frac{1}{S_{norm}} \left( 1 + \sqrt{1 - S_{norm}^2} \right) \quad \text{Equation 4}$$

For X>h the signal S rapidly decreases, and the above can be approximated by:

$$X = h \left( \frac{2}{S_{norm}} - \frac{S_{norm}}{2} \right) \quad \text{Equation 5}$$

The above is practically accurate to 10% when $S_{norm}$<0.9 and to 5% when $S_{norm}$<0.8

So, if h is about 10 cm, the approximation is good for distances up to 20 cm from the wire.

It will be appreciated that this approximation can be used to calculate above-mentioned k in Equations 1 and 2 above. Accordingly, such a sensor may form part of sensor system 56 in the robot 20, with the output of such a sensor being received by the control system 40. The processor(s) 41 of the control system 40 may perform calculations according to Equations 4 and 5, based on the output of the sensor illustrated by FIG. 10.

It will further be appreciated that $S_{max}$ can be calculated if the current I in the wire is known. More practically, however, a value for $S_{max}$ can be measured and then updated along the operation of the robot, thus enabling on-the-fly adaptation.

It may be noted that the above analysis assumes an infinite long wire: this assumption is found to be valid in practice for wire loops also, provided that the distance between the wires is much larger than h (in practice >10*h).

For loops with varying width, if $S_{max}$ is not updated along the operation, then some error will be obtained in the X calculation of Equations 4 and 5 resulting in the gradual turn beginning at a slightly different distance from the boundary than that which is intended.

The magnitude of such errors may be understood more clearly by having regard to FIG. 11, which is a graph showing the variation in $S_{max}$ relative to the distance between the parallel wires, for a rectangular working area 100, where the length L is greater than the width W.

It can be seen from the graph that, perhaps surprisingly, at width (W) of 5 m, the value of $S_{max}$ is only 5% higher than the corresponding value at width (W) of 20 m. Hence, the expected error of Equations 4 and 5 if $S_{max}$ is taken as the one of 20 m width will be less than 3 cm at a distances greater than 20 cm from the wire.

Additionally, in systems where the boundary 101 is delimited by a current-carrying wire, certain arrangements of the wire may result in distortions in the magnetic field produced. Such distortions may, if not accommodated for, lead to anomalous behaviour by the robot. For example, it has been found that, when approaching corners, the magnetic field deviates substantially from the one induced on a long wire.

Figure 12:
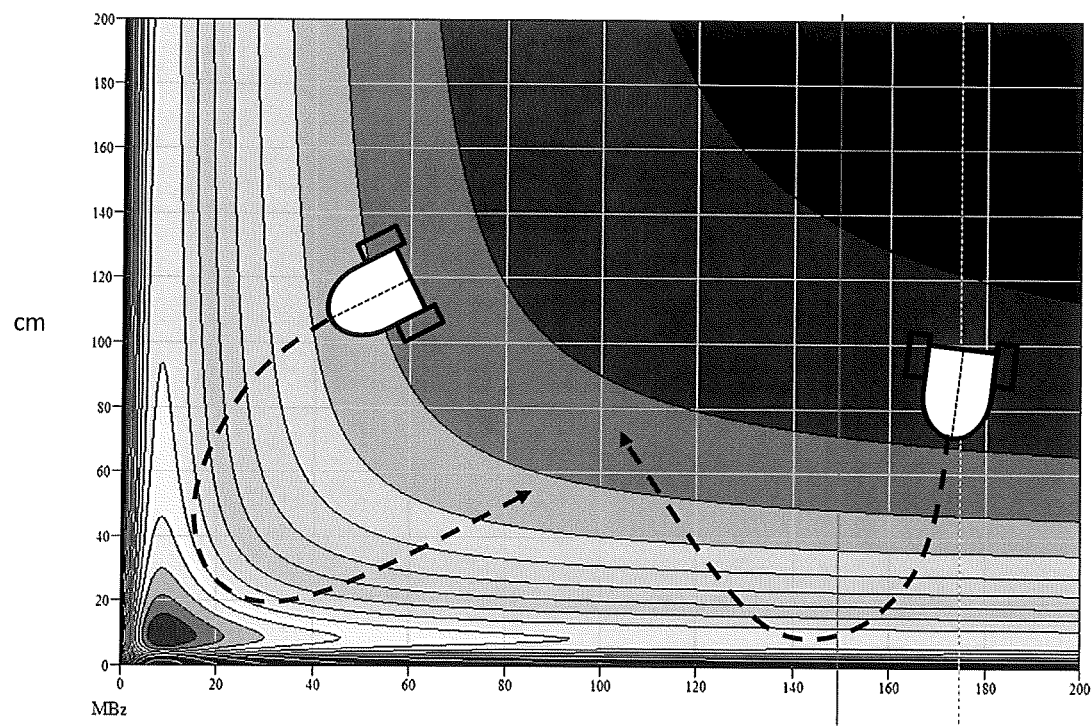
FIG. 12 illustrates deviations in the magnetic field near the interior of the corners of a wire loop boundary delimiter according to a still further embodiment of the present invention.
Figure 13:
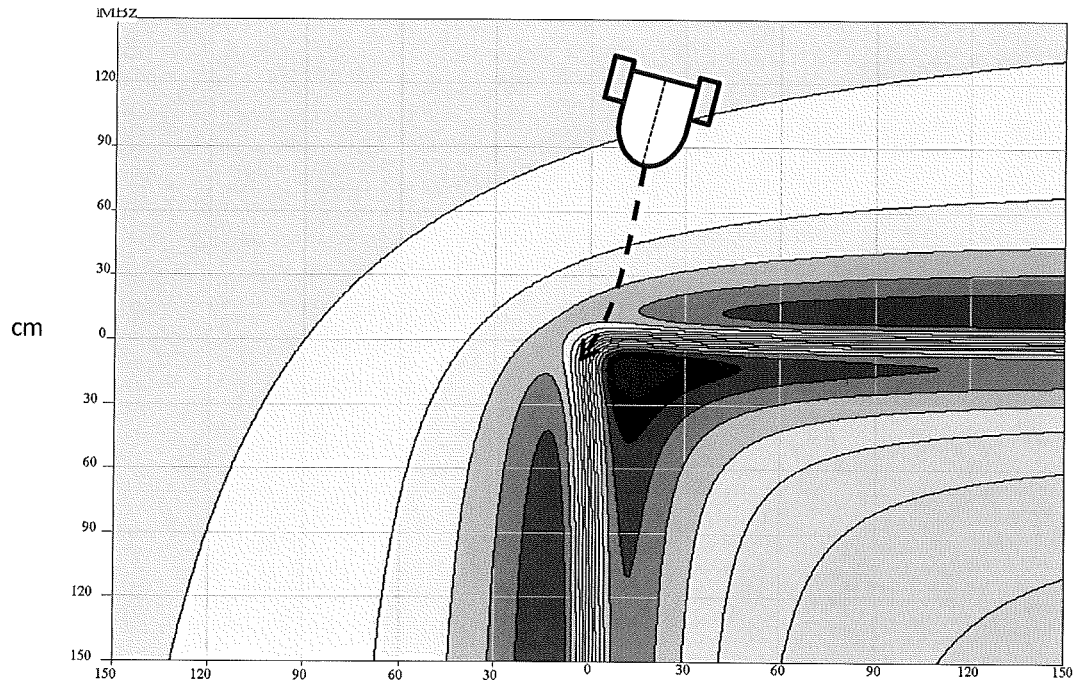
FIG. 13 illustrates similar deviations in the magnetic field to those shown in FIG. 12, but concerns deviations near the exterior of the corners of a wire loop boundary delimiter.

Example of such distortion are illustrated by FIGS. 12 and 13. FIG. 12 shows the magnetic field near a sharp interior corner. In the figure, the grey-level indicates the field amplitude. As may be seen, the value of $S_{max}$ near the corner increases substantially in relation to the one far from the corner, hence the control system 40 may cause the drive system 44 and steering system 46 to perform a gradual turn of the robot 20 at a further distance from the boundary 101 than the intended one. Nevertheless it can be seen that the influence of the corner is local, within less of 1 m from it.

A lack of coverage at those areas near such sharp corners may therefore be corrected by some other means, such as a trajectory along the wire, as discussed above with reference to FIG. 9.

FIG. 13 shows the magnetic field of a sharp external corner. As may be seen, the value of $S_{max}$ near this corner decreases substantially in relation to the one far from the corner, hence the algorithm will not be able to create a trajectory tangent to the wire and the robot 20 may "bounce off" the wire. In some situations it may therefore be necessary to incorporate some reverse or pivot movements to continue. Nevertheless this will be only about 50 cm from such corner and hence will hardly affect the overall performance of the robot 20 across the entire working area.

While a number of the foregoing embodiments have involved a robot having two drive wheels, where turning is accomplished by moving the wheels at different rates or in opposite sense, it should be appreciated that the invention is not so limited. As discussed further above, systems with different drive systems may nonetheless experience improvements in efficiency of area coverage by using gradual turns as defined and/or described herein. The present invention may therefore be practiced using robots having a wide variety of drive systems and/or wheel configurations.

Further, while certain of the above-described embodiments have made use of gradual turns that each describe a path shaped as an arc, it will of course be appreciated that this is not a requirement of the present invention. Indeed, it is envisaged that a number of more complex paths may be suitable. In addition, or otherwise, where reference has been made to the radius of curvature of a path, this should not be assumed to imply a curved path, since it will be appreciated that such a radius of curvature for a path may alternatively be considered equivalent to a rate of change of the angle or orientation of the robot with respect to time.

Still further, while in the foregoing description embodiments may have been described in terms of the processor(s) 41 of the control system 40 of the robot being programmed to carry out calculations and/or to cause other systems to perform certain actions, it should be understood that such an arrangement is by no means essential to the proper operation of these embodiments and that it is specifically envisioned that the same calculations and programming could be implemented in a more general manner, not restricted to the presence of processors(s) 41, control system 40, drive system 44, and/or steering system 46.

More generally, it will be appreciated that this specific description should be understood only as giving examples of embodiments falling within the scope of the present invention. The specific description should thus not be interpreted as limiting the scope of the present invention, which is instead defined by the appended claims with due account being given to equivalents.

The invention claimed is:

1. A robotic system comprising:
    a robot, programmed to move within a working area defined by a boundary;
    the robot having one or more boundary distance sensors for estimating the current distance from said boundary;
    wherein the robot is programmed so as to:
        (a) move across said working area; and,
        (b) when said one or more boundary distance sensors indicates that the robot is a distance X away from said boundary and is approaching said boundary, begin performing a gradual turn, the gradual turn being such that: the robot progressively changes direction while continuing to move across said working area; and,
    the robot transitions from approaching the boundary to receding from the boundary; and wherein the robot is further programmed so as to:
        (c) calculate a path for said gradual turn such that, during the gradual turn, the robot approaches the boundary to a predetermined closest distance, E, and thereafter recedes from the boundary.

2. A system according to claim 1, wherein the path for said gradual turn is such that, at said predetermined closest distance, the robot is moving substantially tangentially of the portion of the boundary proximal to the robot.

3. A system according to claim 2, wherein the robot is further programmed such that said gradual turn is performed as a single, substantially continuous movement.

4. A system according to claim 3, wherein step (c) includes calculating a radius of curvature (R) for the path of said gradual turn; and
    wherein said radius of curvature (R) is calculated based on the orientation of the robot with respect to a portion of the boundary proximal to the robot; and X has a predetermined value.

5. A system according to claim 3, wherein step (c) includes calculating the value of X; and
    wherein the value of X is calculated based on a predetermined value for a radius of curvature (R) of the path of the gradual turn and based on the orientation of the robot with respect to a portion of the boundary proximal to the robot.

6. A system according to claim 1, wherein the robot is further programmed so as to:
    (d) re-calculate the path of the gradual turn at one or more points during the gradual turn, based on information received from said one or more boundary distance sensors corresponding to said one or more points during the gradual turn;
    wherein step (c) includes calculating a radius of curvature (R) for the path of said gradual turn and step (d) includes re-calculating the radius of curvature (R) for the path at said one or more points based on information received from said one or more boundary distance sensors corresponding to said one or more points during the gradual turn; and
    wherein the robot is programmed such that the value of said radius of curvature cannot fall below a predetermined value ($R_{min}$) during said gradual turn.

7. A system according to claim 6, wherein said one or more points are either: a fixed time apart; or a fixed distance apart.

8. A system according to claim 1, wherein said one or more boundary distance sensors comprise a first boundary distance sensor and a second boundary distance sensor spaced apart by a distance d;
    wherein said robot is further programmed such that it can calculate its orientation relative to a proximal portion of the boundary based on information received from said first and second boundary distance sensors and on said distance d.

9. A system according to claim 1, wherein said one or more boundary distance sensors comprise a first boundary distance sensor and wherein said robot is provided with a path distance sensor;
    the robot being further programmed such that, when moving between a first point and a second point, it can calculates its orientation relative to a proximal portion of the boundary based on a measurement (l) of the distance between said first point and said second point provided by said path distance sensor and based on information received from said first boundary distance sensor corresponding to said first and second points; and wherein said path distance sensor comprises at least one of the following:
    (i) an odometer;
    (ii) an accelerometer;
    (iii) a positioning system, optionally comprising a GPS receiver;
    (iv) a timer.

10. A system according to claim 1, wherein the robot has a footprint and wherein, for the whole of the path of said gradual turn, the radius of curvature of the path is greater than half the width of said footprint of the robot and preferably is greater than the width of said footprint of the robot; and
    wherein the robot comprises a payload having an active area over which the payload performs its function, said footprint being defined by said active area.

11. A system according to claim 1, wherein the robot has a footprint having an edge and wherein the value of E is such that, when the robot is at the closest point to the boundary during the gradual turn, the edge of said footprint is substantially coincident with the boundary; and wherein the robot comprises a payload having an active area over which the payload performs its function, said footprint being defined by said active area.

12. A system according to claim 1, wherein said gradual turn is completed when said one or more boundary distance sensors indicates that the robot is a predetermined distance away and receding from the boundary, wherein said predetermined distance is equal to X.

13. A system according to claim 1, wherein said robot is programmed to repeat steps (a) and (b) a plurality of times, so as to scan said working area; preferably wherein either:

step (a) includes movement of the robot according to a scanning pattern, preferably wherein said scanning pattern is repeated a plurality of times at respective locations distributed across said working area so as to scan said working area; or step (a) includes movement of the robot in a substantially straight line across said working area and wherein, immediately before said robot begins said gradual turn, it is moving across said working area according to step (a) on a first substantially straight line and, upon completion of said gradual turn, it moves across said working area on a second substantially straight line, wherein said first substantially straight line path is oriented at an angle to said second substantially straight line path, and wherein said angle is determined according to a probability function.

14. A system according to claim 1, wherein said robot is further programmed to carry out a circuit of said working area, wherein said circuit follows a path that is either adjacent or overlying said boundary; and wherein said robot is programmed to carry out one or more further circuits of said working area, each of said further circuits following a path spaced by a respective fixed distance from said boundary, said fixed distance optionally increasing between consecutive circuits.

15. A system according claim 1, further comprising at least one boundary delimiter, said at least one boundary delimiter preferably generating a boundary signal, said one or more boundary distance sensors being operable to receive said boundary signal; and to estimate the current distance of the robot from said boundary based on said boundary signal; wherein said at least one boundary delimiter comprises a boundary wire loop, a voltage signal being applied during use of the system to said boundary wire loop so as to generate a wireless boundary signal, and, wherein the system further comprises a signal generator operable to apply said voltage signal to said boundary wire loop.

16. A system according to claim 1, wherein said robot further comprises a transducer operable to generate a signal to be reflected by said boundary, said one or more boundary distance sensors being operable to receive said reflected signal and to estimate the current distance of the robot from said boundary based on said reflected signal, wherein said transducer generates a beam of light and optionally comprises a laser; or wherein said transducer is an ultrasonic transducer.

* * * * *